United States Patent
Nasserrafi et al.

(10) Patent No.: US 9,649,728 B2
(45) Date of Patent: May 16, 2017

(54) BIFURCATION HONEYCOMB SANDWICH STRUCTURE WITH OPTIMIZED DOUBLER

(71) Applicant: Spirit AeroSystems, Inc., Wichita, KS (US)

(72) Inventors: Rahbar Nasserrafi, Andover, KS (US); Darrell A. Wade, Wichita, KS (US); Thanh A. Le, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 268 days.

(21) Appl. No.: 14/530,784

(22) Filed: Nov. 2, 2014

(65) Prior Publication Data

US 2016/0122031 A1    May 5, 2016

(51) Int. Cl.
B23K 31/00 (2006.01)
B23K 31/02 (2006.01)
B21D 47/04 (2006.01)

(52) U.S. Cl.
CPC .............. B23K 31/02 (2013.01); B21D 47/04 (2013.01)

(58) Field of Classification Search
CPC .... B32B 3/12; B23K 1/0014; B23K 2201/02; B23K 2201/001; B23K 2201/18; B23K 35/325
USPC .......................... 228/157, 181; 428/116, 593
See application file for complete search history.

(56) References Cited

U.S. PATENT DOCUMENTS

| | | | | |
|---|---|---|---|---|
| 3,072,225 A | * | 1/1963 | Long | B21D 47/00 156/197 |
| 2010/0030362 A1 | * | 2/2010 | Paik | B21D 13/02 700/110 |
| 2012/0291416 A1 | * | 11/2012 | Chiou | F02K 1/60 60/226.2 |

OTHER PUBLICATIONS

ASM Titanium Ti-6242 http://asm.matweb.com/search/SpecificMaterial.asp?bassnum=MTA642 Apr. 2013.*

* cited by examiner

*Primary Examiner* — Erin Saad
(74) *Attorney, Agent, or Firm* — Hovey Williams LLP

(57) ABSTRACT

A method of shaping a metallic honeycomb panel using a continuous drive sheet. The metallic honeycomb panel may have a perforated upper sheet, a non-perforated lower sheet, and a metal honeycomb core fixed between the upper and lower sheets. The method may include the steps of designing and manufacturing the drive sheet using finite element analysis (FEA) and criteria regarding shaping of the metallic honeycomb panel, then welding the drive sheet to the lower face of the lower sheet. The drive sheet may cover all of the lower face of the lower sheet and may have varying thicknesses determined based on the criteria and the FEA. The method may also include the steps of heating the drive sheet and metallic honeycomb panel to a creep forming or hot-stretch forming temperature and urging the metallic honeycomb panel and drive sheet into a male or female die mold to be shaped.

19 Claims, 6 Drawing Sheets

BIFURCATION HONEYCOMB SANDWICH STRUCTURE WITH OPTIMIZED DOUBLER

BACKGROUND

Many aircrafts have engines supported by struts protruding from each wing. The engines are each surrounded by various structural and control components, such as a fan duct and/or a thrust reverser. To provide access to the engine for maintenance or repair, the fan duct and thrust reverser are constructed in two halves which can pivot upward about large hinge pins at the strut. Specifically, an inner acoustic wall of the fan duct may include two clam-shell portions cooperatively forming the fan duct. At facing edges of the clam-shell portions, where the two halves attach to each other and/or to the aircraft, flanges extend radially outward therefrom for attachment to the strut. A curved portion of the fan duct's inner acoustic wall, where the flanges meet with the clam-shell portions, may be referred to herein as a bifurcation panel. Each of the bifurcation panels may be welded, mechanically fastened, or otherwise fixed between the flanges and the clam-shell portions.

Bifurcation panels can be manufactured out of titanium alloys to provide temperature resistance, which allows for close proximity to the aircraft engine's core without relying on insulation blankets. Bifurcation panels may have a perforated skin configured to reduce engine noise. One type of bifurcation panel is entirely formed of b21s titanium and has welded honeycomb ribbons inside, welded between a perforated upper sheet and a solid lower sheet. Fabrication of this type of bifurcation panel is typically performed using either creep forming or hot plasticity forming with male or female die molds. The bifurcation panel is forced into the female die cavity or over the male die by means of gas pressure, while the panel is maintained at a temperature of approximately 1,550 degrees Fahrenheit. This process typically utilizes pull tabs and/or a stainless steel doubler welded around a perimeter of the bifurcation panel to its solid lower sheet. The pull tabs or doublers may form a frame with edges overlapping edges of the bifurcation panel. Furthermore, a stainless steel foil or stainless steel sheet may be required to be placed between the die and the pull tabs or doublers to prevent graphite contamination in the bifurcation panel. Unfortunately, the welds between the doubler and the solid lower sheet of the bifurcation panel often leak, which may halt the forming process due to the release of forming pressure. In addition, uneven application of forming force at discrete locations on the doubler or pull tabs may result in stresses which cause the honeycomb ribbon structure to buckle and deform to an unacceptable level.

SUMMARY OF THE INVENTION

Embodiments of the present invention solve the above-mentioned problems and provide a distinct advance in metallic honeycomb panels. Specifically, embodiments of the present invention provide a method of shaping a metallic honeycomb panel using a continuous sacrificial drive sheet. The metallic honeycomb panel may have an upper sheet, a lower sheet with opposing upper and lower faces, and a metal honeycomb core fixed between the upper and lower sheets. The method may include the steps of welding the drive sheet to the lower face of the lower sheet, heating the drive sheet and metallic honeycomb panel to a creep forming or hot-stretch forming temperature, and urging the metallic honeycomb panel and drive sheet into a male or female die mold. The drive sheet may be sized and shaped to cover and contact all of the lower face of the lower sheet. The drive sheet may have at least one portion having a first thickness and at least another portion having a second thickness different from the first thickness.

In another embodiment of the invention, a method of shaping a metallic honeycomb panel may include the steps of receiving criteria regarding shaping the metallic honeycomb panel and using the criteria to design and manufacture a continuous sacrificial drive sheet. The metallic honeycomb panel may have an upper sheet, a lower sheet with opposing upper and lower faces, and a metal honeycomb core fixed between the upper and lower sheets. The method further include the steps of welding the drive sheet to the lower face of the lower sheet, heating the drive sheet and metallic honeycomb panel to a creep forming or hot-stretch forming temperature, and urging the metallic honeycomb panel and drive sheet into a male or female die mold using an induced pressure differential or mechanical force. The drive sheet may be sized and shaped to cover and contact all of the lower face of the lower sheet. The drive sheet may have at least one portion having a first thickness and at least another portion having a second thickness different from the first thickness.

In yet another embodiment of the invention, the metallic honeycomb panel is a bifurcation panel for an aircraft nacelle. The bifurcation panel may have a perforated upper sheet, a non-perforated lower sheet, and a metal honeycomb core fixed between the upper and lower sheets. A method of shaping the bifurcation panel using a continuous drive sheet may include the steps of designing and manufacturing the drive sheet using finite element analysis (FEA) and criteria regarding shaping of the bifurcation panel, then welding the drive sheet to the lower face of the lower sheet. The drive sheet may cover all of the lower face of the lower sheet and may have varying thicknesses determined based on the criteria and the FEA. The method may also include the steps of heating the drive sheet and bifurcation panel to a creep forming or hot-stretch forming temperature and urging the bifurcation panel and drive sheet into a male or female die mold to be shaped. Furthermore, the method may include attaching clamps at opposing ends of the drive sheet and stretching the drive sheet via actuation of the clamps in opposing directions during the urging step, while the metallic honeycomb panel and the drive sheet are still heated. Finally, the method may include cooling the drive sheet and bifurcation panel and cutting the welded drive sheet off of the bifurcation panel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
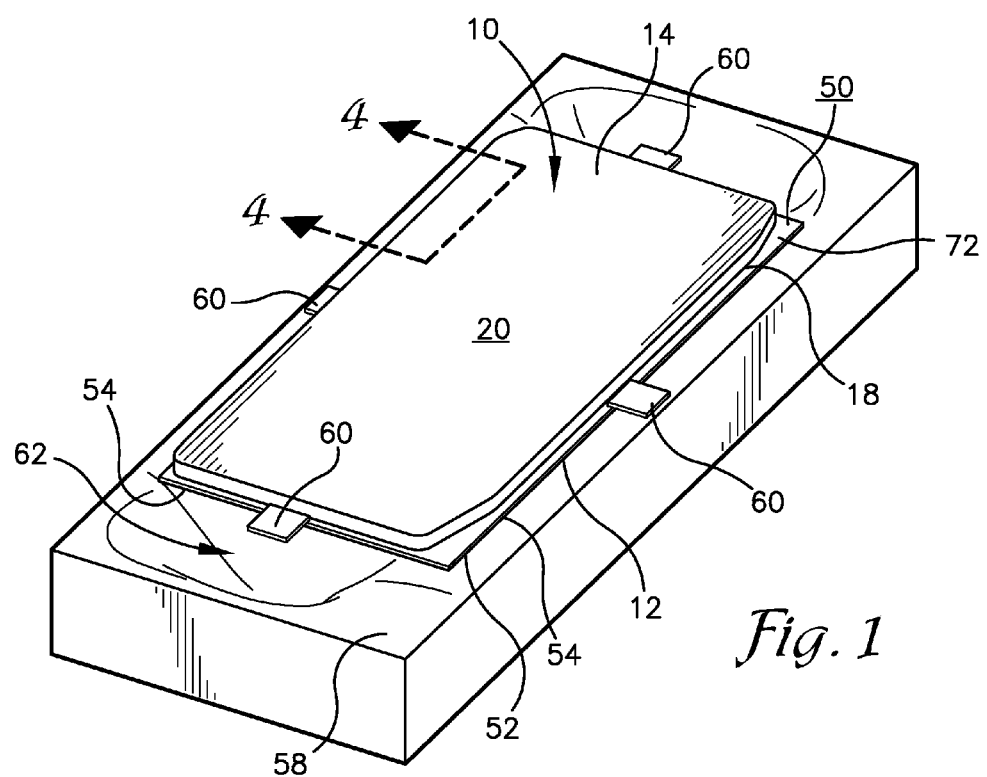
FIG. 1 is a perspective view of a metallic honeycomb panel and a drive sheet constructed in accordance with various embodiments of the present invention and shown in tooling configured for assisting in the shaping of the metallic honeycomb panel.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A metallic honeycomb panel 10 constructed in accordance with various embodiments of the current invention is shown in FIG. 1. The metallic honeycomb panel 10 is welded to a full-bottom continuous drive sheet 12 to provide even strain control throughout the metallic honeycomb panel 10 as it is shaped via creep-forming, hot stretch-forming, or other hot-forming methods using heat, pressure, and/or stretching to shape metals.

Figure 2:
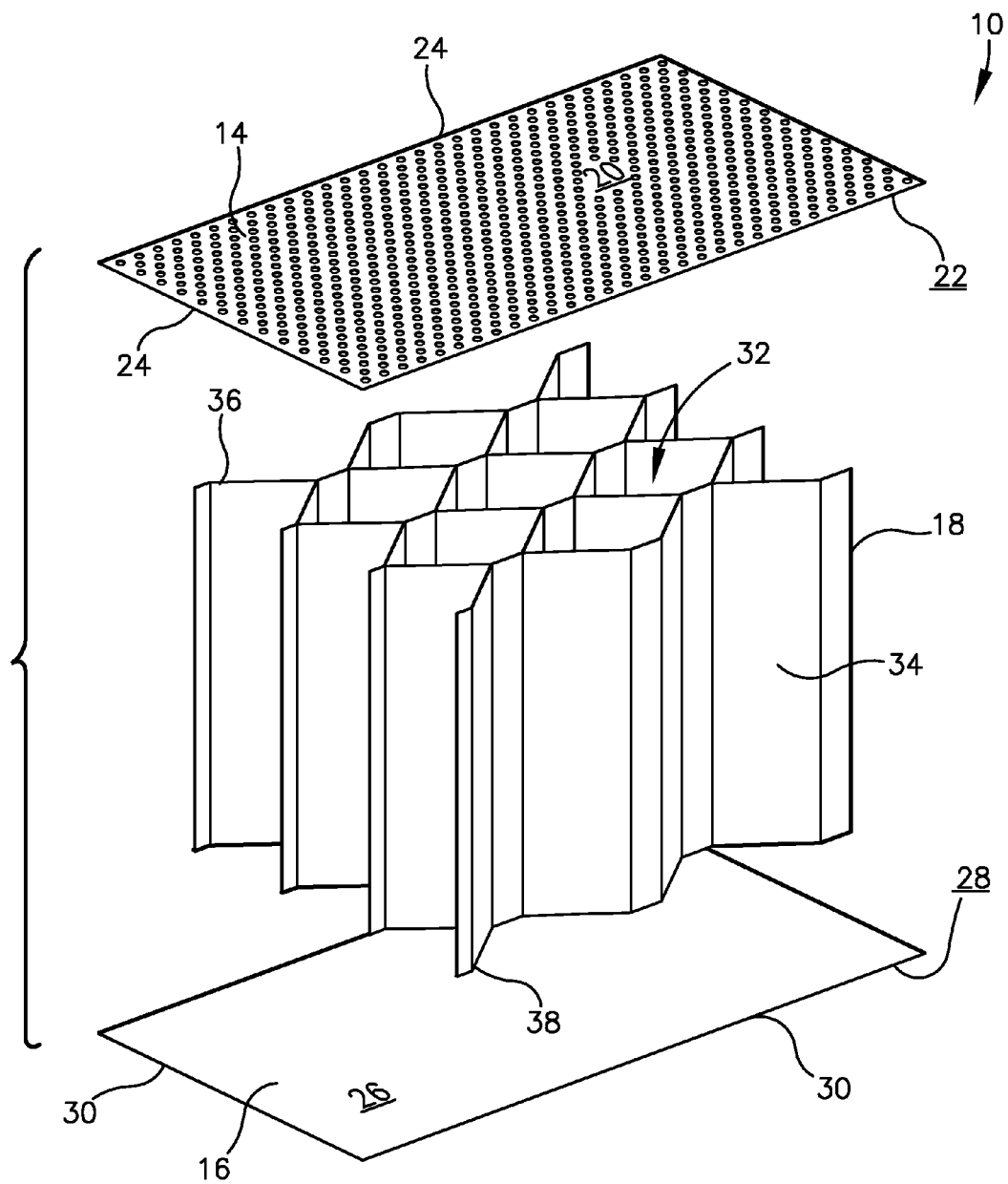
FIG. 2 is an exploded perspective view of the metallic honeycomb panel of FIG. 1.

As illustrated in FIG. 2, the honeycomb panel 10 may include an upper sheet 14, a lower sheet 16, and a honeycomb core 18 sandwiched between the upper and lower sheets 14,16. The upper sheet 14 may have an upper face 20, an opposing lower face 22, and a plurality of side edges 24. Likewise, the lower sheet 16 may have an upper face 26, an opposing lower face 28, and a plurality of side edges 30, as illustrated in FIG. 2. The metallic honeycomb panel 10 may be made of titanium, such as Ti-Beta 21s or metals of similar characteristics.

The upper sheet 14, in some embodiments of the invention, may be perforated, while the lower sheet 16 may be solid and/or unperforated. The honeycomb core 18 may comprise hexagonally-shaped cells 32 integrally formed with each other in an arrangement of rows and/or columns. The upper sheet 14, lower sheet 16, and honeycomb core 18 may each be made of the titanium described above and may be integrally molded of one-piece construction with each other or independently formed, then welded, bonded, or otherwise attached to each other. The honeycomb core cells 32 may be formed by walls 34 extending between upper edges 36 attached to the lower face 22 of the upper sheet 14 and lower edges 38 attached to the upper face 26 of the lower sheet 16.

Figure 3:
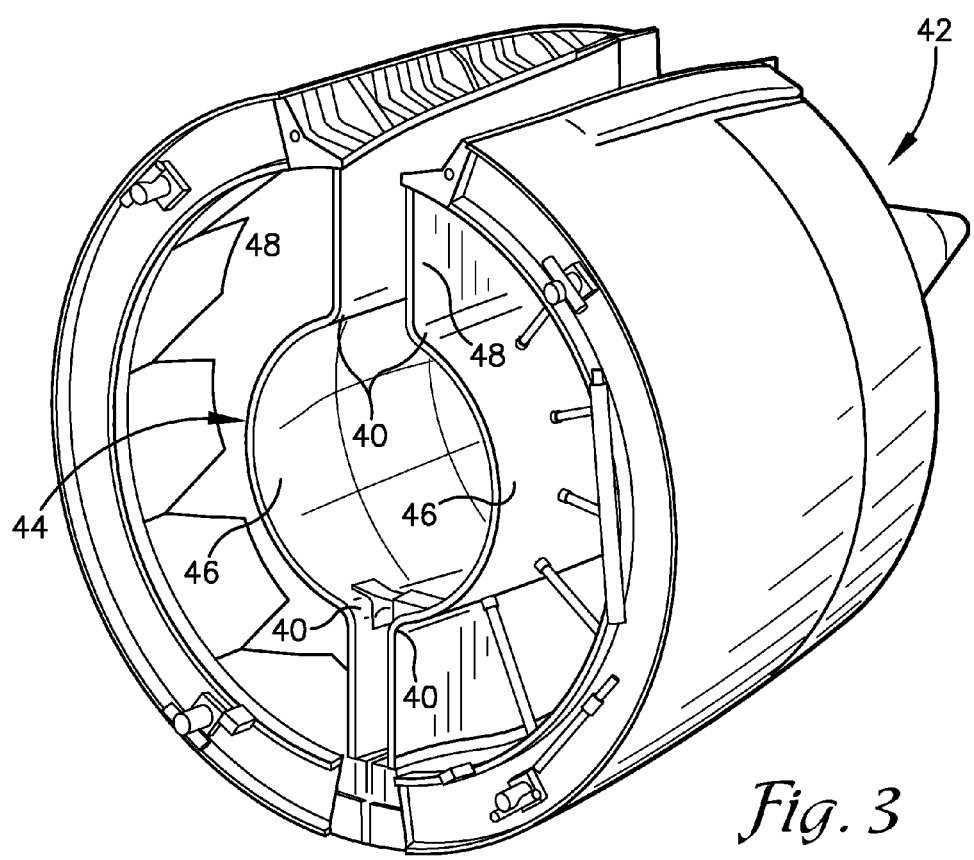
FIG. 3 is a perspective view of a portion of an aircraft nacelle featuring a bifurcation panel made of the metallic honeycomb panel of FIG. 1.

In some embodiments of the invention, the metallic honeycomb panel 10 may be a bifurcation panel 40 for an aircraft nacelle 42. Specifically, as illustrated in FIG. 3, the bifurcation panel 40 may be a component of a fan duct inner acoustic wall 44 having a tight-radiused curve. For example, the inner acoustic wall 44 may include two clam-shell portions 46 cooperatively forming the inner acoustic wall 44 that typically surrounds an aircraft engine. At facing edges of the clam-shell portions 46, where these two halves attach to each other and/or to an aircraft, flanges 48 may extend radially outward therefrom for attachment to a strut or pylon of an aircraft. A curved portion of the fan duct's inner acoustic wall 44, where the flanges 48 meet with the clam-shell portions 46, may be referred to herein as the bifurcation panel 40. In some embodiments of the invention, the bifurcation panel 40 may comprise a plurality of the metallic honeycomb panels 10 attached to each other. The bifurcation panels 40 may be welded, mechanically fastened, or otherwise fixed between the flanges 48 and the clam-shell portions 46.

Figure 4:
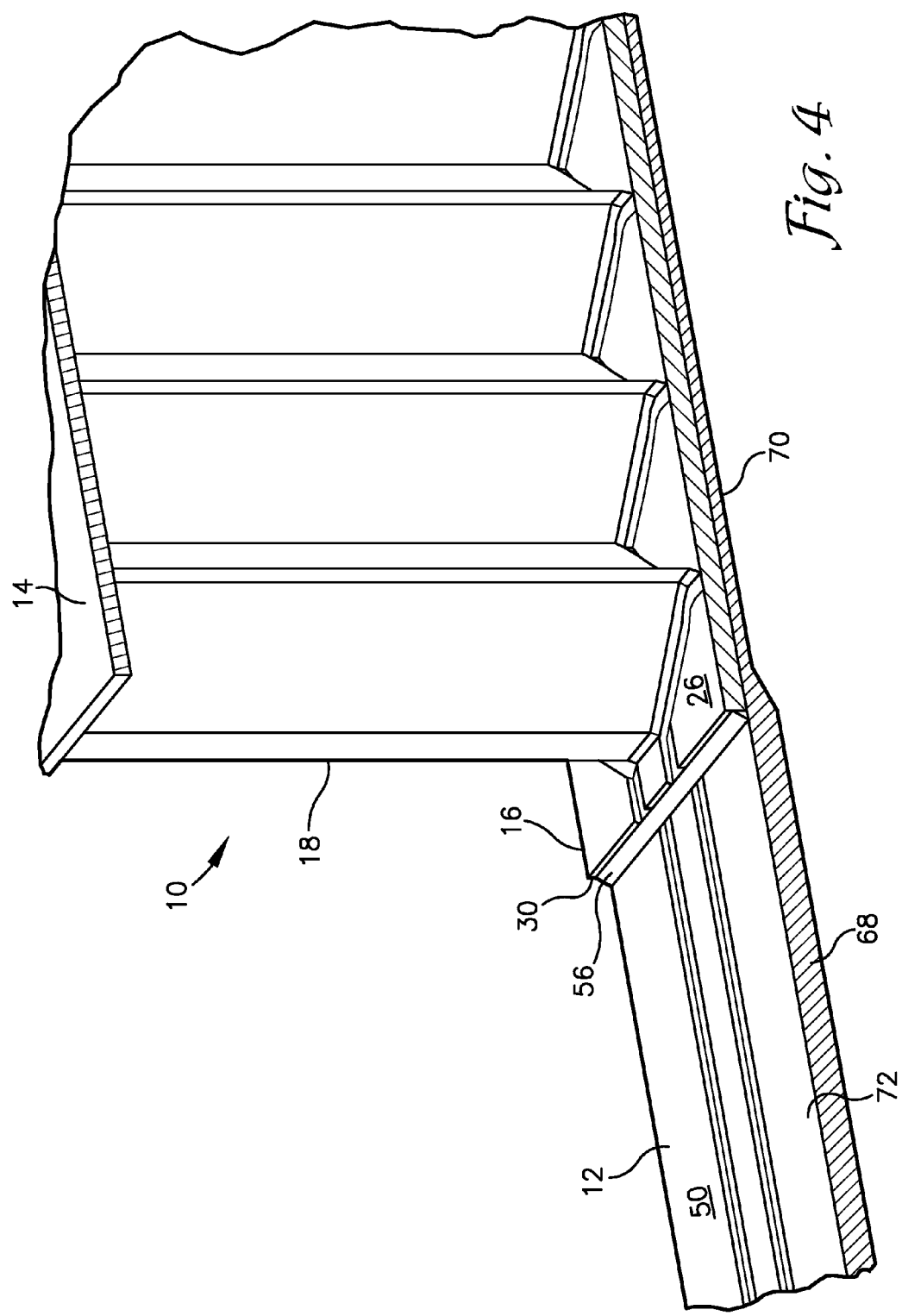
FIG. 4 is a cross-sectional view of the metallic honeycomb panel and drive sheet of FIG. 1 taken along line 4-4 in FIG. 1.

The drive sheet 12 may also be made of titanium, such as Ti-6242 or metals of similar characteristics. As illustrated in FIGS. 1 and 4, the drive sheet 12 may have an upper face 50, a lower face 52 opposite of the upper face 50, and a plurality of side edges 54. The drive sheet 12 may have an area greater than an area of the upper and/or lower sheets 14,16. The drive sheet 12 may be formed independently and then welded to the metallic honeycomb panel 10, as later described herein. Specifically, the upper face 50 of the drive sheet 12 may be welded to the lower face 28 of the lower sheet 16. The edges 30 of the lower sheet 16 may be substantially perpendicular to the upper face 50 of the drive sheet 12, forming a right angle with the drive sheet 12, as illustrated in FIG. 4. Therefore, in some embodiments of the invention, a fillet-style weld 56 or weld beads may be used to weld the upper face 50 of the drive sheet 12 to one or more of the edges 30 of the lower sheet 16 of the metallic honeycomb panel 10.

As illustrated in FIG. 1, tooling required for creep forming or hot-forming the metallic honeycomb panel may comprise a male or female die mold 58, clamps 60, and the like. Furthermore, the tooling may include a pressurization chamber (not shown) and/or other apparatuses configured for pressurizing the metallic honeycomb panel 10 into a cavity 62 or against a protrusion of the die mold 58. The pressurization chamber may be configured for being heated to various desired creep forming or hot-forming temperatures, depending on the specific size and shape of the metallic honeycomb panel 10 to be formed therein.

Figure 5:
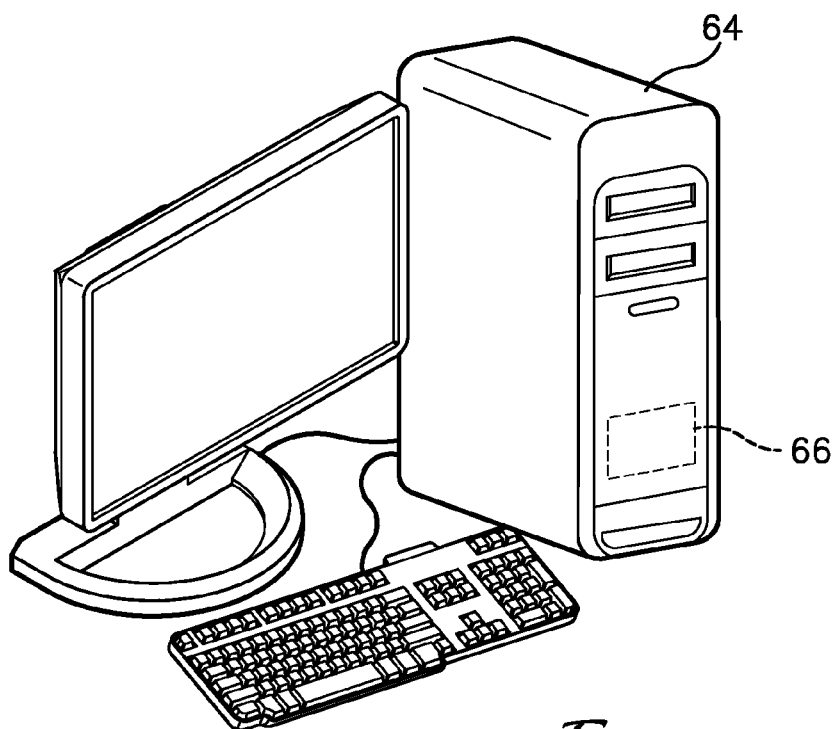
FIG. 5 is a schematic view of a computing system configured for designing the drive sheet of FIGS. 1 and 4 using finite element analysis (FEA)

In some embodiments of the invention, as illustrated in FIG. 5, a computing device 64, computer, processor, or the like may be used to design the size, shape, and thickness of the drive sheet 12 using finite element analysis. For example, the computing device 64 may include microprocessors, microcontrollers, digital signal processors (DSPs), field-programmable gate arrays (FPGAs), analog and/or digital application-specific integrated circuits (ASICs), communication busses, electrical wires, signal processing circuitry, and the like, or combinations thereof. The computing device 64 may generally execute, process, or run instructions, code, software, firmware, programs, applications, apps, services, daemons, or the like, or may step through states of a finite-state machine.

The computing device 64 may further comprise and/or access memory elements 66. The memory elements 66 may include data storage components such as read-only memory (ROM), programmable ROM, erasable programmable ROM, random-access memory (RAM), hard disks, floppy disks, optical disks, flash memory, thumb drives, universal serial bus (USB) drives, and the like, or combinations thereof. The memory elements 66 may include, or may constitute, a "computer-readable medium". The memory elements 66 may store instructions, equations, code, software, firmware, programs, applications, apps, services, daemons, or the like that are executed by various elements of the computing device 64 described above. The memory elements 66 may also store material and tooling limits and characteristics, metallic honeycomb panel properties and characteristics, as described below, and other user-selected or pre-programmed variables useable to determine desired dimensions of the drive sheet 12. The memory elements 66 may communicate with other various elements of the computing device 64 through address busses, data busses, control lines, and the like.

The computing device 64 may be configured for using various characteristics of the metallic honeycomb panel 10, its desired molded shape, and/or other variables to determine how the thickness of the drive sheet 12 should be varied. These characteristics may be input by the user and/or accessed from the memory elements 66 described above. For example, characteristics for determining the precise dimensions (including thickness) of the drive sheet 12 may include material properties, tooling limits, a degree of curvature to be imposed via the die mold 58, dimensions and/or spacing of the honeycomb core cells 32, thickness of the metallic honeycomb panel 10 and/or its components, upper sheet dimensions and characteristics, lower sheet dimensions and characteristics, amount of pressurization and/or heat to be applied during creep forming or hot forming of the metallic honeycomb panel 10, and the like. The computing device 64 may be configured to use a finite element analysis (FEA), along with the characteristics and variables described above, to determine minimum thicknesses of the drive sheet 12 required in various areas of the drive sheet 12, as described in detail below.

In various embodiments of the invention, a method of shaping the metallic honeycomb panel 10 may include the steps of welding the drive sheet 12 to the lower face 28 of the lower sheet 16, heating the drive sheet 12 and the metallic honeycomb panel 10 to a creep-forming or hot-stretch forming temperature, and urging the metallic honeycomb panel 10 and drive sheet 12 into or against the die mold 58 described above. The method may also include designing and manufacturing the drive sheet 12 using FEA. The drive sheet 12, for example, may be sized and shaped to cover an entire area of the lower face 28 of the lower sheet 16, and may also be designed with a varying thickness, as illustrated in FIG. 4. The method may also include the steps of attaching tooling, such as the clamps 60 described above, to the drive sheet 12 and stretching the drive sheet 12 while urging the drive sheet 12 into the die mold 58.

Figure 6:
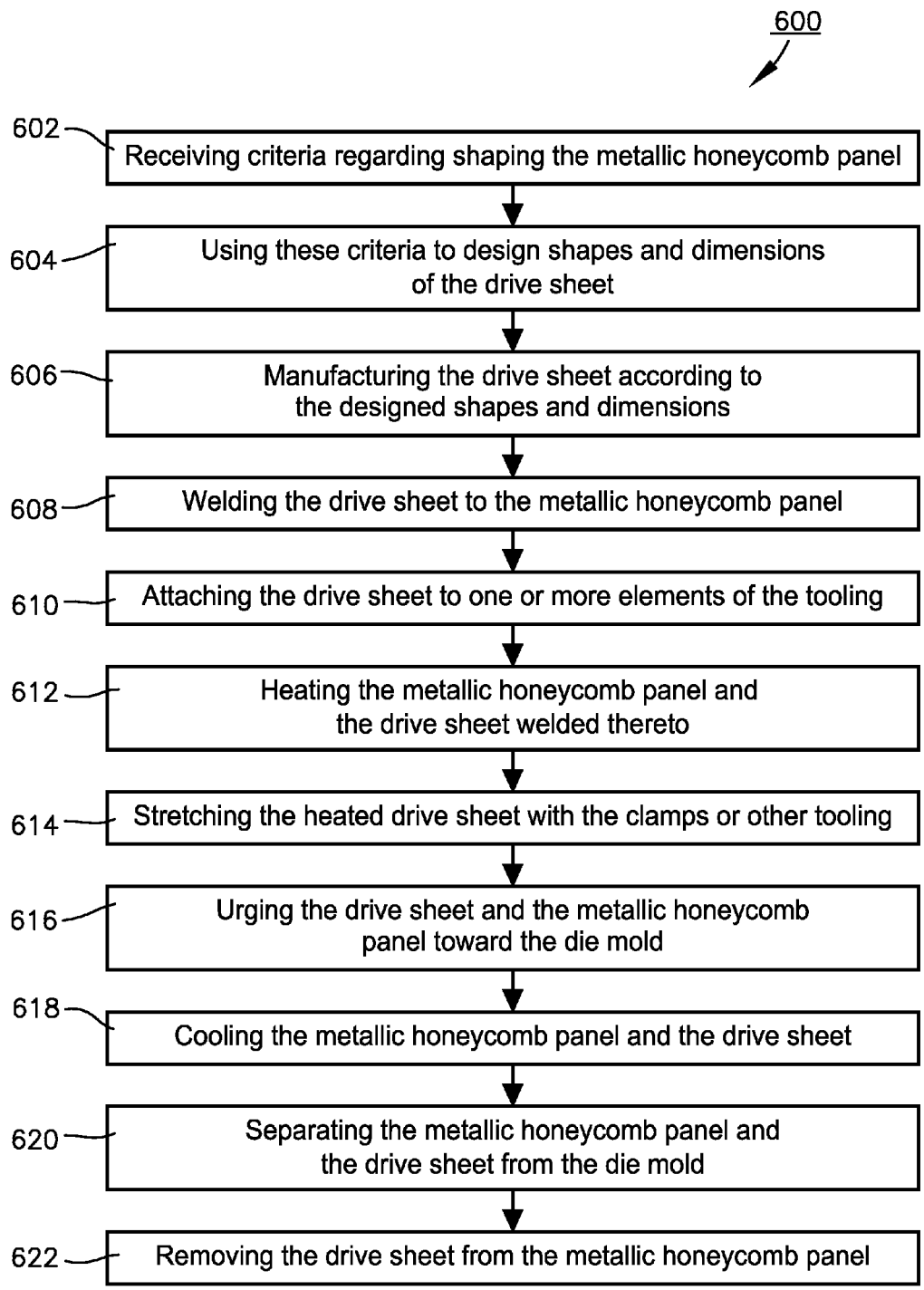
FIG. 6 is a flow diagram of steps of a method for shaping the metallic honeycomb panel, in accordance with various embodiments of the present invention.

A method 600 for shaping the metallic honeycomb panel 10 welded to the full-bottom, continuous drive sheet 12, in accordance with various embodiments of the present invention, is shown in FIG. 6 and described in more detail below. The steps of the method 600 may be performed in the order as shown in FIG. 6, or they may be performed in a different order. Furthermore, some steps may be performed concurrently as opposed to sequentially. In addition, some steps may not be performed. Some of the steps may represent code segments or executable instructions of the computer program or applications described above.

The method 600 may comprise the steps of receiving criteria regarding shaping the metallic honeycomb panel 10, as depicted in block 602, and using these criteria to design shapes and dimensions of the drive sheet 12, as depicted in block 604. These steps may be performed via the computing device 64, and the criteria may be input by a user and/or accessed from the memory elements 66 described above. For example, the criteria may include various characteristics of the metallic honeycomb panel 10, its desired molded shape, and/or other variables to determine how the thickness of the drive sheet 12 should be varied. These characteristics may be provided to the computing device 64 as individual variables and/or may be provided via a digital 3D model of the metallic honeycomb panel 10. As noted above, characteristics for determining the precise dimensions of the drive sheet 12 may include a degree of curvature to be imposed via the die mold 58, dimensions and/or spacing of the honeycomb core cells 32, thickness of the metallic honeycomb panel 10 and/or its components, upper sheet dimensions and characteristics, lower sheet dimensions and characteristics, amount of pressurization and/or heat to be applied during creep forming or hot forming of the metallic honeycomb panel 10, and the like.

The step of using the criteria to define shapes and dimensions of the drive sheet 12 may be performed via the computing device 64 using finite element analysis (FEA), as known in the art and noted above. The FEA may be used, for example, to determine a minimum acceptable thickness of the drive sheet 12 based on the criteria for the metallic honeycomb panel 10. The minimum acceptable thickness may vary throughout a length and width of the drive sheet 12, based on the criteria described above. For example, the drive sheet 12 may have a greater thickness in areas 68 starting at or overlapping the edges 30 of the lower sheet 16, but a lesser thickness in areas 70 inward of the edges 30 of the lower sheet 16, as depicted in FIG. 4. This saves on cost of material and provides drive sheets that provide precise amounts of strain relieve throughout the length and width of the metallic honeycomb panel 10.

The method 600 may further include the steps of manufacturing the drive sheet 12 according to the shapes and dimensions determined in step 604, as depicted in block 606, and welding the drive sheet 12 to the metallic honeycomb panel 10, as depicted in block 608. The welding may include traditional welding methods. For example, the upper face 50 of the drive sheet 12 may be welded to the lower face 28 of the lower sheet 16 at the side edges 30 of the lower sheet 16, as illustrated in FIG. 4.

Next, the method 600 may include the step of attaching the drive sheet 12 to one or more elements of the tooling, as depicted in block 610. Note that the dimensional area of the upper face 50 of the drive sheet 12 is typically greater than the dimensional area of the lower face 28 of the lower sheet 16. Thus, when the drive sheet 12 is welded to the metallic honeycomb panel 10, outer portions 72 of the drive sheet 12 near the drive sheet's side edges 54 extend beyond the side edges 30 of the lower sheet 16, as illustrated in FIGS. 1 and 4. These outer portions 72 of the drive sheet 12 may be clamped or otherwise mechanically attached to various tooling configured for stretching the drive sheet 12. For example, clamps 60 are illustrated as being clamped to the drive sheet 12 if FIG. 1.

The method 600 may further include the step of heating the metallic honeycomb panel 10 and the drive sheet 12 welded thereto, as depicted in block 612, then stretching the drive sheet 12 with the clamps 60 or other tooling, as depicted in block 614, and urging the drive sheet 12 and the metallic honeycomb panel 10 toward the die mold 58, as depicted in block 616. During the heating step, the metals of the metallic honeycomb panel 10 may be heated to a desired creep-forming or hot stretch-forming temperature. The temperature and amount of time these components are heated during shaping thereof may depend on the types of metal used and on dimensions of the metallic honeycomb panel 10 and/or the drive sheet 12. In some embodiments of the invention, the temperature and amount of time spent heating the materials during creep-forming may be determined via FEA using the computing device 64 described above.

The amount of stretching and the timing of the stretching of the drive sheet 12 may also be based on a variety of factors and may, in some embodiments of the invention, be determined via FEA using the computing device 64. The stretching may be performed manually, mechanically, electro-mechanically, or using any other stretching methods known in the art for creep-forming and the like. Urging of the drive sheet 12 and the metallic honeycomb panel 10 may be accomplished using the pressurization chamber for creating a pressure differential to urge the drive sheet 12 toward the die mold 58. Additionally or alternatively, the die mold 58 and/or the drive sheet 12 (welded to the metallic honeycomb panel 10) may be mechanically moved toward each other and/or pressed into engagement with each other.

The method 600 may also include the steps of cooling the metallic honeycomb panel 10 and the drive sheet 12, as depicted in block 618, and separating the metallic honeycomb panel 10 and the drive sheet 12 from the die mold 58, as depicted in block 620. Next, in some embodiments of the invention, the method 600 may include the step of removing the drive sheet 12 from the metallic honeycomb panel 10, as depicted in block 622. Specifically, the drive sheet 12 may be cut away from the metallic honeycomb panel 10. For example, the metallic honeycomb panel 10 may be formed slightly thicker than required for a given application in one or more regions to allow for later trimming when the welded-on drive sheet 12 is cut away therefrom.

As noted in the Background section above, the pull tabs or doublers of prior art forming methods created a frame-type configuration partially overlapping edges of the bifurcation panel. This prior art arrangement required a stainless steel foil over the die mold to prevent graphite contamination in the metallic honeycomb panel through the hole in the middle of the frame-type configuration of the pull tabs or doublers. Advantageously, the method 600 described above does not use this frame-type configuration, but rather the continuous drive sheet 12 extending fully across the honeycomb panel 10, which thus prevents any graphite contamination and avoids the issue of leaking altogether. Furthermore, varying the thickness of the drive sheet 12 based on FEA may allow the stress and strain imposed on the honeycomb panel 10 to be controlled in a more even manner, such that each of the honeycomb cells 32 or the honeycomb cell walls 34 are normal to local surface contours or substantially perpendicular to any curves into which the honeycomb panel 10 is shaped.

Although the invention has been described with reference to the embodiments illustrated in the attached drawing figures, it is noted that equivalents may be employed and substitutions made herein without departing from the scope of the invention as recited in the claims. For example, while the metallic honeycomb panel 10 described herein is illustrated as a bifurcation panel for an aircraft, this method of shaping a metallic honeycomb panel may be used in the construction of other apparatuses, and in industries other than aerospace, without departing from the scope of the invention.

Having thus described various embodiments of the invention, what is claimed as new and desired to be protected by Letters Patent includes the following:

1. A method of shaping a metallic honeycomb panel having an upper sheet, a lower sheet with opposing upper and lower faces, and a metal honeycomb core fixed between the upper and lower sheets, the method comprising:
    welding a sacrificial drive sheet to the lower face of the lower sheet, wherein the drive sheet is sized and shaped to cover an entire area of the lower face of the lower sheet, wherein the drive sheet has at least one portion having a first thickness and at least another portion having a second thickness different from the first thickness;
    heating the drive sheet and metallic honeycomb panel to a creep forming or hot-stretch forming temperature;
    urging the metallic honeycomb panel and drive sheet into a male or female die mold;
    cooling and the metallic honeycomb panel and the drive sheet; and
    cutting the welded drive sheet off of the metallic honeycomb panel.

2. The method of claim 1 further comprising attaching tooling to the drive sheet after the step of welding the drive sheet to the lower sheet; and stretching the drive sheet while urging the drive sheet into the die mold.

3. The method of claim 1, wherein the metallic honeycomb panel is made of Ti-Beta 21s titanium.

4. The method of claim 1, wherein the drive sheet is made of Ti-6242 titanium.

5. The method of claim 1, further comprising the steps of designing the shape and dimensions of the drive sheet using finite element analysis (FEA) based on characteristics related to shaping of the metallic honeycomb panel.

6. The method of claim 5, wherein the characteristics related to shaping of the metallic honeycomb panel include at least one of: material properties of the metallic honeycomb panel or the drive sheet, a degree of curvature to be imposed on the metallic honeycomb panel via the die mold, thickness of the metallic honeycomb panel, dimensions or spacing of the honeycomb core cells, upper sheet dimensions and characteristics, lower sheet dimensions and characteristics, the die mold's shape, and the die mold's dimensions, and amount of pressurization or heat to be applied during creep forming or hot forming of the metallic honeycomb panel.

7. The method of claim 1, wherein the first portion of the drive sheet contacts the lower sheet of the metallic honeycomb panel and the second portion of the drive sheet extends laterally outward from the first portion, beyond edges of the lower sheet, wherein the first thickness is thinner than the second thickness.

8. A method of shaping a metallic honeycomb panel having an upper sheet, a lower sheet with opposing upper and lower faces, and a metal honeycomb core fixed between the upper and lower sheets, the method comprising:
   receiving criteria regarding shaping the metallic honeycomb panel;
   using the criteria to design shapes and dimensions of a continuous sacrificial drive sheet;
   manufacturing the drive sheet according to the designed shapes and dimensions;
   welding the drive sheet to the lower face of the lower sheet, wherein the drive sheet is sized and shaped to cover and contact all of the lower face of the lower sheet, wherein the drive sheet has at least one portion having a first thickness and at least another portion having a second thickness different from the first thickness;
   heating the drive sheet and metallic honeycomb panel to a creep forming or hot-stretch forming temperature; and
   urging the metallic honeycomb panel and drive sheet into a male or female die mold using an induced pressure differential or mechanical force.

9. The method of claim 8, further comprising clamping opposing ends of the drive sheet extending outward of the welded-on lower face, after the step of welding the drive sheet to the lower sheet; and stretching the drive sheet while urging the drive sheet into the die mold.

10. The method of claim 8, wherein the metallic honeycomb panel is made of Ti-Beta 21s titanium.

11. The method of claim 8, wherein the drive sheet is made of Ti-6242 titanium.

12. The method of claim 8, further comprising the steps of cooling the drive sheet and metallic honeycomb panel and cutting the welded drive sheet off of the metallic honeycomb panel.

13. The method of claim 8, wherein the step of using the criteria to design the shapes and dimensions of the drive sheet is performed via a computing device using finite element analysis (FEA), wherein the criteria includes characteristics related to shaping of the metallic honeycomb panel.

14. The method of claim 13, wherein the characteristics related to shaping of the metallic honeycomb panel include at least one of: material properties of the metallic honeycomb panel or the drive sheet, a degree of curvature to be imposed on the metallic honeycomb panel via the die mold, thickness of the metallic honeycomb panel, dimensions or spacing of the honeycomb core cells, upper sheet dimensions and characteristics, lower sheet dimensions and characteristics, the die mold's shape, and the die mold's dimensions, and amount of pressurization or heat to be applied during creep forming or hot forming of the metallic honeycomb panel.

15. The method of claim 8, wherein the first portion of the drive sheet contacts the lower sheet of the metallic honeycomb panel and the second portion of the drive sheet extends laterally outward from the first portion, beyond edges of the lower sheet, wherein the first thickness is thinner than the second thickness.

16. The method of claim 8, wherein the metallic honeycomb panel is a bifurcation panel configured for forming a portion of an inner acoustic wall of an aircraft engine nacelle.

17. A method of shaping an aircraft nacelle's titanium bifurcation panel, the bifurcation panel having a perforated upper sheet, a non-perforated lower sheet with opposing upper and lower faces, and a metal honeycomb core fixed between the upper and lower sheets, the method comprising:
   receiving, with a computing device, criteria regarding shaping the bifurcation panel;
   designing shapes and dimensions of a continuous sacrificial drive sheet on the computing device using finite element analysis (FEA) and the criteria;
   manufacturing the drive sheet according to the designed shapes and dimensions;
   welding the drive sheet to the lower face of the lower sheet, wherein the drive sheet is sized and shaped to cover and contact all of the lower face of the lower sheet, wherein the drive sheet has varying thicknesses determined based on the criteria and the FEA;
   heating the drive sheet and metallic honeycomb panel to a creep forming or hot-stretch forming temperature;
   attaching clamps at opposing ends of the drive sheet extending outward of the welded-on lower face;
   stretching the drive sheet via actuation of the clamps in opposing directions; and
   urging the metallic honeycomb panel and drive sheet into a Male or female die mold using an induced pressure differential or mechanical force;
   cooling the drive sheet and bifurcation panel; and
   cutting the welded drive sheet off of the bifurcation panel.

18. The method of claim 17, wherein the criteria regarding shaping the bifurcation panel include at least one of: material properties of the bifurcation panel or the drive sheet, a degree of curvature to be imposed on the bifurcation panel via the die mold, thickness of the bifurcation panel, dimensions or spacing of the honeycomb core cells, upper sheet dimensions and characteristics, lower sheet dimensions and characteristics, the die mold's shape, and the die mold's dimensions, and amount of pressurization or heat to be applied during creep forming or hot forming of the bifurcation panel.

19. The method of claim 17, wherein the metallic honeycomb panel is made of Ti-Beta 21s titanium and the drive sheet is made of Ti-6242 titanium.

* * * * *